(12) United States Patent
Linnot et al.

(10) Patent No.: US 9,505,663 B2
(45) Date of Patent: Nov. 29, 2016

(54) METHOD FOR MANUFACTURING REFRACTORY GRAINS CONTAINING CHROMIUM(III) OXIDE

(75) Inventors: Cyril Linnot, Lyons (FR); Olivier Citti, Wellesley, MA (US)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 389 days.

(21) Appl. No.: 13/985,377

(22) PCT Filed: Feb. 14, 2012

(86) PCT No.: PCT/IB2012/050668
§ 371 (c)(1),
(2), (4) Date: Sep. 25, 2013

(87) PCT Pub. No.: WO2012/110952
PCT Pub. Date: Aug. 23, 2012

(65) Prior Publication Data
US 2014/0011031 A1 Jan. 9, 2014

(30) Foreign Application Priority Data

Feb. 14, 2011 (FR) ...................... 11 51165

(51) Int. Cl.
| C04B 35/105 | (2006.01) |
| C04B 35/626 | (2006.01) |
| C04B 41/00  | (2006.01) |
| C01G 37/02  | (2006.01) |
| C01G 37/033 | (2006.01) |
| C04B 35/106 | (2006.01) |
| C04B 35/622 | (2006.01) |
| C04B 35/63  | (2006.01) |
| C04B 35/66  | (2006.01) |

(52) U.S. Cl.
CPC ............ *C04B 41/009* (2013.01); *C01G 37/02* (2013.01); *C01G 37/033* (2013.01); *C04B 35/105* (2013.01); *C04B 35/106* (2013.01); *C04B 35/622* (2013.01); *C04B 35/626* (2013.01); *C04B 35/6263* (2013.01); *C04B 35/62204* (2013.01); *C04B 35/62695* (2013.01); *C04B 35/63* (2013.01); *C04B 35/66* (2013.01); *C01P 2004/03* (2013.01); *C01P 2004/61* (2013.01); *C01P 2006/80* (2013.01); *C04B 2235/3217* (2013.01); *C04B 2235/3241* (2013.01); *C04B 2235/3243* (2013.01); *C04B 2235/5436* (2013.01); *Y10T 428/2982* (2015.01)

(58) Field of Classification Search
CPC .......... C04B 35/105; C04B 35/62695; C04B 2235/3241; C04B 35/6261; C04B 35/62625; C04B 35/6263
See application file for complete search history.

(56) References Cited

U.S. PATENT DOCUMENTS

| 4,823,359 A | 4/1989 | Ault et al. | |
| 6,261,480 B1 * | 7/2001 | Ogata ................. | C01G 23/003 252/500 |

(Continued)

FOREIGN PATENT DOCUMENTS

| GB | 1336712 A | * 11/1973 | ............. C04B 18/04 |
| GB | 1 533 890 | 11/1978 | |
| WO | WO 2005/042791 A1 | 5/2005 | |

OTHER PUBLICATIONS

Goerenz; "Chromic Oxide Materials;" Pocket Manual, Refractory Materials; 3rd Edition; May 14, 2008; pp. 140-146.
Jouenne; "Traité de céramiques et matériaux minéraux [Treatise on ceramics and mineral materials];" 1984; pp. 403-405.
May 4, 2012 Search Report issued in International Patent Application No. PCT/IB2012/050668 (with translation).
May 4, 2012 Written Opinion issued in International Patent Application No. PCT/IB2012/050668 (with translation).

*Primary Examiner* — Erin Snelting
(74) *Attorney, Agent, or Firm* — Oliff PLC

(57) ABSTRACT

A method for manufacturing sintered refractory grains containing $Cr_2CO_3$ from an initial refractory product including one or more chromium that includes: A) optionally, \crushing the starting refractory material; B) grinding a filler, comprising said starting refractory material in a liquid medium to obtain a suspension of particles of said starting refractory material; C) preparing a starting mixture including at least 1 wt % of particles of the suspension obtained during the preceding step; D) shaping the starting mixture into the shape of a preform; E) optionally drying the preform obtained in step D); F) sintering the preform so as to obtain a sintered body; G) optionally grinding the sintered body; and H) the optional selection by particle size.

25 Claims, 1 Drawing Sheet

(56) References Cited

U.S. PATENT DOCUMENTS

| | | | | |
|---|---|---|---|---|
| 2004/0254058 A1* | 12/2004 | Takagi | ................ | C04B 33/1327 501/117 |
| 2006/0213397 A1* | 9/2006 | Bethani | ................ | C04B 18/023 106/407 |
| 2010/0179051 A1* | 7/2010 | Citti | ................ | C04B 35/105 501/127 |
| 2011/0275505 A1* | 11/2011 | Gadow | ................ | C01B 31/02 501/1 |
| 2012/0183774 A1* | 7/2012 | Cuypers | ................ | C04B 18/023 428/402 |
| 2012/0297926 A1* | 11/2012 | Hewitt | ................ | C01C 1/026 75/329 |
| 2013/0167592 A1* | 7/2013 | Linnot | ................ | C03B 5/43 65/374.13 |

\* cited by examiner

METHOD FOR MANUFACTURING REFRACTORY GRAINS CONTAINING CHROMIUM(III) OXIDE

TECHNICAL FIELD

The invention relates to sintered refractory grains containing chromium(3) oxide and also to a process for manufacturing sintered refractory grains containing chromium(3) oxide (or $Cr_2O_3$) in several steps starting with new and/or used starting refractory products containing one or more chromium oxides.

The invention also relates to the grains that may be obtained via this process, and also to the uses of said grains especially for the manufacture of sintered refractory products comprising said grains. The invention is also directed toward sintered refractory products comprising said grains and also to processes for manufacturing these sintered refractory products.

PRIOR ART

Chromium is an element existing in several oxidation states: 0, +2, +3, +4, +6.

The +3 form is most widespread, for instance in chromium(3) oxide or $Cr_2O_3$.

The +6 form may also exist: this is hexavalent chromium, or "chromium(6)", as in $CrO_3$.

Sintered refractory products comprising chromium(3) oxide (or chromium(III) oxide) or $Cr_2O_3$ are conventionally obtained by mixing suitable starting materials followed by raw forming of this mixture and baking of the resulting raw component at a temperature and for a time that are sufficient to obtain sintering of this raw component.

Fused refractory products comprising chromium(3) oxide are conventionally manufactured by melting, casting in a mold and solidification by cooling.

Refractory products comprising chromium(3) oxide are conventionally used in applications in which they are subjected to extreme chemical attack, for example in glass-making furnaces, in particular as furnace tank blocks, or in furnaces in which they are in contact with a slag.

The processes for manufacturing these refractory products generate machining wastes and offcuts containing chromium oxides. The storage and removal of these wastes and, after use, of these refractory products represent a cost for their manufacturers or their users. One object of the present invention is to overcome this problem.

Moreover, after use, the used refractory products containing chromium oxides may have chromium(6) contents that are much higher than those of the new products. Now, chromium(6) is a substance that is recognized as being cancerogenic, mutagenic and reprotoxic to man. Various legislations exist in particular fixing:
- the exposure of operatives to dusts containing chromium (6) in workstations;
- the limit of the amount of chromium(6) in wastes.

The amount of chromium(6) contained in used refractory products makes it difficult, or event sometimes impossible, to reuse them in their existing form, since the means for collective and/or individual protection are either technically unsuitable, or economically unviable. It is also becoming increasingly difficult and expensive to remove refractory products with a chromium(6) content of greater than 1000 ppm.

Various techniques are known for reducing the amount of chromium(6):
- contained in an aqueous solution, such as adsorption, reduction-precipitation, electrolysis or reverse dialysis;
- contained in a product in the form of a block, such as reduction using a chromium(6)-reducing agent, for instance ascorbic acid, carbon-based elements, ferrous ammonium sulfates, sodium bisulfates, sodium thiosulfate, iron(II), sulfides, barium compounds, hydrazine, hydroxylamine, etc. for example sprayed onto the surface of the block to be treated, by heat treatment of the blocks under a reductive atmosphere (CO, sulfide, $CO+H_2$, $N_2+H_2$, etc.), melting of the used blocks and reduction to metal, encapsulation in a cement matrix, etc.

These techniques all have drawbacks:
- the filtration techniques are long and expensive;
- certain techniques do not make it possible to obtain purity levels that are sufficient for reuse;
- certain techniques cannot be performed on an industrial scale, since they are too complicated;
- most of these techniques allow only a temporary purification, in the sense that they do not make it possible to ensure the non-reformation of chromium(6), from chromium(3), during the use or a subsequent heat treatment of the purified products;
- certain chromium(6)-reducing agents are expensive and/or toxic.

Another object of the invention is to provide a process for treating refractory products containing chromium(6) while, at least partially, avoiding these drawbacks.

SUMMARY OF THE INVENTION

A first object of the present invention is directed toward a process for manufacturing sintered refractory grains containing $Cr_2O_3$ from a starting refractory product comprising a chromium oxide, all the dimensions of the starting refractory product being greater than or equal to 1 mm. This process comprises the following steps, in this order:

A) optionally, step of crushing the starting refractory product,
B) milling of a charge to be milled comprising said optionally crushed starting refractory product, in a liquid medium in order to obtain a suspension of particles of said starting refractory product, more than 80% of said particles, as a mass percentage, having a size of less than 50 μm,
C) preparation of a starting mixture comprising at least 1% by mass of particles of the suspension obtained in the preceding step,
D) forming of the starting mixture in the form of a green part,
E) optionally, drying of the green part obtained in step D),
F) sintering of the green part to obtain a sintered body,
G) optionally, milling of the sintered body,
H) optionally, granulometric selection,
steps D), G) and H) being adapted such that the sintered body, optionally milled in step G) and/or selected in step H), has the form of a particle with a size of greater than 50 μm and less than 20 mm (or "grain") or of a powder comprising such particles, preferably comprising more than 80%, more than 90% and preferably substantially 100% by mass of such particles.

As will be seen in greater detail hereinbelow, the inventors have found that the "final" sintered refractory products obtained from the grains thus manufactured have performance qualities equivalent to those of the products according to the prior art.

The manufacturing process according to the invention may use, as starting refractory product, used or new refractory products. It thus makes it possible to benefit from an economical source of chromium oxides, and to offer a channel for the recycling of said products, and thus to limit the amounts thereof to be treated as waste.

Another advantage of the process according to the invention is that it makes it possible to recycle, possibly simultaneously, new products and/or used products having very different contents of chromium(3) oxide.

Without wishing to be bound to any theory, it is thought that the step of very fine milling in liquid medium makes it possible to homogenize the chromium(3) content in the grains. This homogeneity within each grain, on the microscopic scale, is possible irrespective of the starting refractory product. Mixing of the grains finally leads to a homogeneous powder and then, as a consequence, to homogeneous sintered final refractory products.

This process of manufacturing refractory grains also limits the amount of chromium(6) in the grains and, surprisingly, limits, or even eliminates, the amount of chromium(6) subsequently formed in the final refractory products.

A process according to the invention may also comprise one or more of the following optional characteristics:

In step B), the optionally crushed starting refractory product represents more than 30%, more than 40%, more than 50%, more than 60%, more than 70%, more than 90%, or even substantially 100% of the mass of the solid elements containing $Cr_2O_3$ (particles and/or blocks) of the charge to be milled.

The mass amount of particles (grains and/or fine particles) containing a chromium oxide, in particular, is greater than 10%, greater than 20%, or even greater than 30% of the mass of the solid elements containing a chromium oxide or, respectively, containing $Cr_2O_3$, of the charge to be milled. These particles may be particles of the optionally crushed starting refractory product, and/or may be other particles, preferably deliberately added. The mass amount of these other particles may be greater than 10%, greater than 20%, or even greater than 30% of the mass of the solid elements containing a chromium oxide, in particular containing $Cr_2O_3$.

The charge to be milled comprises alumina, optionally in the form of a solid solution with $Cr_2O_3$. In one embodiment, the charge to be milled comprises more than 3%, more than 10%, and/or less than 60%, less than 50%, less than 40%, less than 30% alumina, as a mass percentage on the basis of the oxides.

In step B), the charge to be milled contains a machining slurry comprising particles containing a chromium oxide, in particular containing $Cr_2O_3$. The mass amount of particles containing a chromium oxide in said machining slurry may be greater than 10%, greater than 20%, or even greater than 30% of the mass of the solid elements containing a chromium oxide, or even of the solid elements containing $Cr_2O_3$ of the charge to be milled.

In step B), the milling is continued until the medium size of the particles of the suspension is less than 40 µm, preferably less than 20 nm, particularly preferably less than 10 µm and/or preferably greater than 2 µm.

The starting refractory product is a sintered or fused product or is a mixture of pieces made of a sintered product and of pieces made of a fused product.

The starting refractory product has an apparent density of greater than 2 g/cm$^3$, or even greater than 2.5 g/cm$^3$, or even greater than 2.8 g/cm$^3$, or even greater than 3 g/cm$^3$.

The starting refractory product comprises more than 5%, more than 10%, more than 15%, more than 20%, more than 25%, or even more than 30% of chromium oxide, as a mass percentage on the basis of the oxides.

The starting refractory product comprises alumina, optionally in the form of a solid solution with $Cr_2O_3$. Preferably, the starting refractory product comprises more than 3%, more than 10%, and/or less than 60%, less than 50%, less than 40%, less than 30% alumina, as a mass percentage on the basis of the oxides.

The starting refractory product has a chromium(6) content of greater than 100 ppm, greater than 150 ppm, greater than 300 ppm, greater than 500 ppm, or even greater than 1000 ppm.

All the dimensions of the starting refractory product are greater than or equal to 10 mm, preferably greater than or equal to 50 mm, preferably greater than or equal to 80 mm, advantageously greater than or equal to 100 mm, and even more advantageously greater than or equal to 200 mm.

The charge to be milled comprises a chromium(6)-reducing element, preferably chosen from ascorbic acid, alcohols, in particular methanol, ethanol, oxalic acid, ferrous ammonium sulfates, sodium bisulfites, thiosulfates, in particular sodium thiosulfate, potassium thiosulfate, iron thiosulfate, iron in metallic form, a compound in which iron is in oxidation state 2+, sulfides, in particular iron sulfide, barium compounds, zinc compounds, hydrazine, hydroxylamine, sulfur dioxide, glucose, salts in which titanium is in oxidation state 3+, borohydrides, hypophosphites, and mixtures thereof. Preferably said chromium(6)-reducing element is ascorbic acid. Preferably, the amount of chromium(6)-reducing element in said charge to be milled is between 0.1% and 10% by mass relative to the mass of the starting refractory product.

The charge to be milled comprises, in suspension and/or in solution, a siliceous compound comprising more than 35% by mass of silica, preferably chosen from glasses comprising silica, in particular amorphous silicas, crystalline silica particles, fumed silica, and mixtures thereof. Preferably, the amount of silica provided by said siliceous compound is greater than 1%, greater than 2%, greater than 4%, and/or less than 10%, less than 8%, less than 6%, and more preferably substantially equal to 5% by mass relative to the mass of the dry matter of the charge to be milled.

The starting mixture comprises less than 60% by mass of particles of the suspension obtained after step B).

The starting mixture comprises a mixture of alumina and/or chromium oxide powders, optionally in the form of a solid solution, preferably with a median size of less than 50 µm.

The green part obtained in step D) is a grain.

The sintering in step F) is performed under reductive conditions.

At the end of step F), the sintered body, preferably the grain, has a density of greater than 85%, preferably greater than 88%, preferably greater than 90%, and better still greater than 92% of the theoretical density.

A second object of the present invention is directed toward a grain, in particular manufactured or liable to have been manufactured according to a process according to the invention, said grain having:
- a chromium(3) oxide content "C", measured by X-ray fluorescence, of less than 90%, preferably less than 80%, preferably less than 70%, or even less than 65%, or even less than 55%, or even less than 45%, or even less than 35%, or even less than 25%, and
- on a view in cross section (after polishing), allowing the observation of a surface of the grain with a length of greater than 200 µm and a width of greater than 150 µm, a percolating chromium-alumina solid solution comprising a zone of heterogeneity, preferably more than one zone of heterogeneity, or even more than two zones of heterogeneity, the smallest dimension of which is greater than 5 µm, or even greater than 10 µm and in which the chromium oxide content is
  less than C−1.5% or greater than C+1.5% if C≤30% or less than (1−x)·C or greater than (1+x)·C, with x>0.05, or even x>0.1, or even x>0.2, or even x>0.3, or even x>0.4, or even x>0.5, if C>30%.

Preferably, said zone of heterogeneity has a maximum dimension of less than 50 µm, less than 40 µm, less than 30 µm, less than 20 µm, in said view in cross section.

Optionally, one or more zones of vitreous silicate phase may be observed in said view in cross section.

Preferably, said zone(s) of vitreous silicate phase have a silica content of greater than 40%, preferably greater than 45%, preferably greater than 50%, or even greater than 60%. Preferably, the grain has, in said view in cross section, more than one zone, preferably more than two zones, preferably more than three zones of vitreous silicate phase preferably having a form which is inscribed in a rectangle whose length is greater than or equal to 10 µm, or even greater than or equal to 20 µm and whose width is greater than or equal to 5 µm, or even greater than or equal to 10 µm. The "length" and "width" of said zone refer to the length of the large side and the length of the small side of said rectangle (smallest rectangle in which said zone is contained), respectively. These zones are referred to hereinbelow as "large zones of vitreous silicate phase".

Preferably, in the large zones of vitreous silicate phase
- the chromium(3) oxide content is less than 3%, preferably less than 2.5%, preferably less than 2%, or even less than 1.5%, these analyses preferably being performed by pointing using a microprobe;
- the iron oxide content is greater than 0.5%, these analyses preferably being performed by pointing using a microprobe;
- the CaO content is greater than 2%, these analyses preferably being performed by pointing using a microprobe.

Preferably, the large zones of vitreous silicate phase contain boron oxide.

A third object of the present invention is directed toward a grain obtained or liable to be obtained via a process according to the invention.

A fourth object of the present invention is directed toward a powder comprising more than 80%, more than 90%, more than 99%, and preferably substantially 100% of grains according to the invention, as a mass percentage.

A fifth object of the present invention is directed toward a process for manufacturing a sintered refractory product, referred to as the "final refractory product", comprising the following steps:

a) preparation of a starting charge comprising grains manufactured according to the present invention in an amount of between 10% and 85% by mass on the basis of the mass of the oxides of the starting charge,
b) forming of said starting charge so as to obtain a green part,
c) optionally, drying of the green part;
d) sintering of the green part so as to obtain the final refractory product,
e) optionally, finishing of the final refractory product.

A sixth object of the present invention is directed toward a sintered refractory product comprising between 10% and 85% by mass of grains according to the invention.

DEFINITIONS

A process according to the invention is in particular intended for the recycling of "recycled" starting refractory products. A recycled product may be "new" or "used".

A "new" starting refractory product refers to a product derived from a fashioned refractory product that has never been used, in particular for the intended application, or consisting of such a product (offcuts, unsold products, manufacturing waste, etc.).

A "used" starting refractory product refers to a product that has been used, for example due to the fact that it has been placed in contact with molten glass, or that it has been subjected to hot gases charged with corrosive elements or dusts.

The starting materials (minerals, oxide powders, etc.) are therefore not new or used starting refractory products.

A "powder" is an assembly of particles. The term "grain" means a particle with a size of greater than 50 µm and less than 20 mm. The assembly of grains is also known as the "granulate".

The term "fine particle" means a particle with a size of less than or equal to 50 µm. The assembly of fine particles is known as the "fine fraction".

A "block" is an element that is neither a grain nor a fine particle.

The term "granule" means an agglomerate of elementary particles, said agglomerate having a sphericity index of greater than 0.6, i.e. being in a substantially spherical form.

The sphericity index of a particle is the ratio between its smallest diameter and its largest diameter.

The term "particle size" means the dimension of a particle conventionally given by a particle size distribution characterization performed with a laser granulometer. The laser granulometer used for the examples is a Partica LA-950 machine from the company HORIBA.

The percentiles or "centiles" 10 ($D_{10}$), 50 ($D_{50}$), and 99.5 ($D_{99.5}$) of a powder are the particle sizes corresponding to the mass percentages of 10%, 50% and 99.5%, respectively, on the cumulative particle size distribution curve of the sizes of the particles of the powder, the sizes of the particles being classified in increasing order. For example, 10%, by mass, of the particles of the powder have a size less than $D_{10}$ and 90% of the particles by mass have a size greater than $D_{10}$. The sizes and the percentiles may be determined by means of a particle size distribution performed with the aid of a laser granulometer.

The term "maximum size" of a powder refers to the percentile 99.5 ($D_{99.5}$) of said powder.

The term "median size" or "median diameter" of a powder refers to the percentile 50 ($D_{50}$) of said powder.

The term "comprising a" should be understood as meaning "comprising at least one", unless otherwise indicated.

BRIEF DESCRIPTION OF THE FIGURES

Other objects, aspects, properties and advantages of the present invention will emerge more clearly in the light of the description and of the examples that follow and on examination of the attached drawing in which.

DETAILED DESCRIPTION

Figure 1:
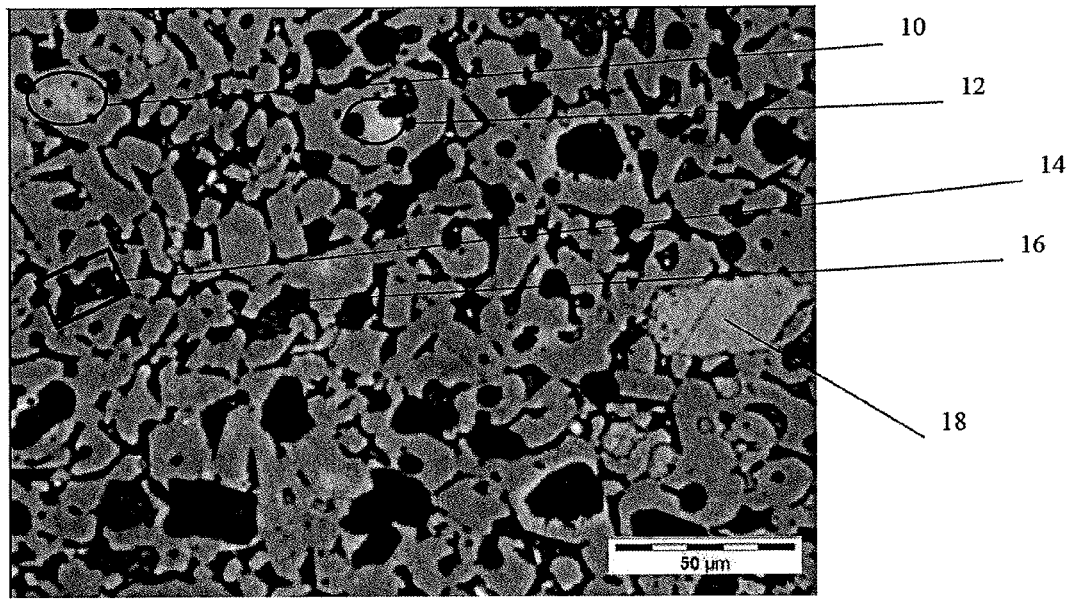
FIG. 1 is a cross section of a grain according to the invention obtained from a new starting refractory product:
the gray elements are crystals of chromium-alumina solid solution,
the black shapes are porosity,
elements 10 and 12 are zones of heterogeneity of the chromium-alumina solid solution,
elements 14 and 16 are large zones of vitreous silicate phase especially containing chromium(3) oxide (the rectangle in which the large zone of vitreous silicate phase 14 is inscribed has been shown),
element 18 is a trace of the starting refractory product, containing 92% $Cr_2O_3$,
the shiny elements are particles of zirconia and/or of titanium oxide.

The starting refractory products may be used products and/or new products (especially manufacturing offcuts, machining waste or unsold products), in particular in the form of blocks.

Preferably, the starting refractory products are refractory materials comprising several refractory oxides, preferably resulting from a transformation by man of starting materials, for example a melting or sintering operation.

The oxides may be, for example, in solid solution in the starting refractory products.

The starting refractory products may in particular be sintered products or fused products. The starting refractory products may be sintered or dry shaped products.

The used starting refractory products, in particular when they have been in contact with glass, generally contain chromium(6). Preferably, they are thus stored in a closed environment: container, sack or "big bag", for example.

The handling of the starting refractory products, especially used products, which might generate dusts is preferably performed under a spray of a solution containing a chromium(6)-reducing element, preferably ascorbic acid. This spraying makes it possible simultaneously to prevent any chromium(6) dusts from becoming airborne and to transform part of the chromium(6) into chromium(3).

Besides chromium oxides, the starting refractory products generally comprise one or more of the following compounds: $Al_2O_3$, $ZrO_2$, $SiO_2$, $TiO_2$, $B_2O_3$, $MgO$, $CaO$, $Na_2O$, $Fe_2O_3$. In particular, the starting product may be chosen from the products ZIRCHROM30, ZIRCHROM50, ZIRCHROM60 and ZIRCHROM85 sold by the company SAVOIE REFRACTAIRES. Preferably, the starting refractory products comprise more than 80%, more than 90%, more than 95%, or even substantially 100% of oxides, as a mass percentage.

The process according to the invention is intended for treating starting refractory products of which all the dimensions are greater than or equal to 1 mm, preferably greater than or equal to 10 mm, preferably greater than or equal to 50 mm, more preferably greater than or equal to 80 mm, advantageously greater than or equal to 100 mm, and even more advantageously greater than or equal to 200 mm. The form of the starting refractory products is, however, not limiting. In particular, these products may be powders or blocks. Preferably, the starting refractory product comprises less than 5%, preferably less than 2%, or even less than 1% moisture.

Step A)

In step A), the size of the starting refractory products is reduced so as to be suitable for the milling performed in step B). Step A) is generally necessary when the refractory products are in the form of blocks.

The optional reduction of the size of the starting refractory products may be performed, for example, using a pneumatic hammer. The following equipment may in particular be used: Caterpillar model: 303.5C CR equipped with a rock breaker—weight: 3.5 T and power: 30 kW. In particular, if this crushing is insufficient, use may also be made of a ball mill model BHIL of volume 4500 liters and power 55 kW.

If the starting refractory products contain chromium(6), the crushing is preferably performed under a spray of an ascorbic acid solution. Preferably, step A) is adapted such that all the dimensions of the starting refractory product introduced into the mill in step B) are less than 250 mm.

Step B)

Step B) consists in milling a charge to be milled comprising said optionally crushed starting refractory product, in a liquid medium so as to obtain, at the end of milling, a suspension of dry matter whose particles have, for more than 80%, more than 90%, more than 95%, or even substantially 100% of them, a size of less than 50 μm, preferably less than 20 μm, more preferably less than 10 μm and/or preferably greater than 2 μm.

By definition, the milling charge, for example milling balls, does not form part of the charge to be milled.

The origin of the starting refractory products introduced into the mill is not limiting. In particular, starting refractory products containing different chromium oxides and/or with different contents may be milled simultaneously in order to obtain an assembly of particles adapted to the grains to be manufactured.

The charge to be milled may comprise products comprising a chromium oxide which, unlike a "starting refractory product", have at least one dimension less than 1 mm, for example machining slurries or small particles, especially small particles generated during the crushing of the starting refractory product.

In a first embodiment, the dry matter of the charge to be milled consists, for more than 80%, or even more than 85%, or even more than 90% by mass of elements (fine particles or grains, blocks) comprising a chromium oxide. Preferably, these elements comprising a chromium oxide are derived from the starting refractory product (starting refractory product and/or crushed starting refractory product).

In a second embodiment, the charge to be milled has a composition corresponding to that of the sintered body to be manufactured. In other words, the adjustment of the composition is performed in step B), and not in step C). Besides the elements comprising a chromium oxide, other oxides may then be added.

Preferably, and in particular if the starting refractory product introduced into the mill contains chromium(6), and especially more than 100 ppm, more than 500 ppm or more than 1000 ppm of chromium(6), the charge to be milled comprises a chromium(6)-reducing element for reducing the chromium(6) to chromium(3) during the milling in wet medium and comprises a siliceous compound containing more than 35% by mass of silica. Preferably, said chromium (6)-reducing element is chosen from ascorbic acid, alcohols, in particular methanol, ethanol, oxalic acid, ferrous ammonium sulfates, sodium bisulfites, thiosulfates, in particular sodium thiosulfate, potassium thiosulfate, iron thiosulfate, iron in metallic form, a compound in which iron is in oxidation state 2+, sulfides, in particular iron sulfide, barium compounds, zinc compounds, hydrazine, hydroxylamine, sulfur dioxide, glucose, salts in which titanium is in oxidation state 3+, borohydrides, hypophosphites, and mixtures thereof. Preferably, said chromium(6)-reducing element is ascorbic acid.

Preferably, the chromium(6)-reducing element, preferably ascorbic acid, is present in an amount ranging from 0.1% to 10%, preferably ranging from 0.5% to 5%, preferably ranging from 1.5% to 2%, and better still substantially equal to 1.7% by mass relative to the mass of the starting refractory product.

Without wishing to be bound to any theory, it was found that ascorbic acid acidifies the suspension and improves the reduction of chromium(6) to chromium(3).

Preferably, the siliceous compound contains more than 40%, preferably more than 50%, preferably more than 70% silica, as a mass percentage.

Preferably, the siliceous compound is chosen from glasses comprising silica, in particular amorphous silicas, crystalline silica particles, fumed silica, and mixtures thereof.

Preferably, it is present in an amount such that the content of silica provided by said siliceous compound is between 1% and 10% by mass relative to the mass of the starting refractory product introduced into the mill. Preferably, the content of silica provided by said siliceous compound ranges from 2% to 8%, preferably from 4% to 6% and better still is about 5% by mass relative to the mass of the dry matter of the charge to be milled.

Preferably, the median size of the siliceous compound is less than 200 µm, preferably less than 150 µm, preferably less than 100 µm, or even less than 50 µm, or even less than 10 µm, or even less than 1 µm.

The siliceous compound promotes the creation of a vitreous silicate phase during the sintering in step F). Without wishing to be bound to any theory, it is considered that this phase will trap the chromate particles that might be reformed and thus allow a substantially definitive, i.e. non reversible, stabilization.

In a preferred embodiment, the siliceous compound is fumed silica. In addition to creating a vitreous silicate during the sintering, fumed silica will make it possible to slow down the sedimentation of the suspension during the milling and thus facilitate the extraction of the suspension after milling.

The liquid medium is generally water. The amount of liquid medium used is generally between 20% and 40% by mass relative to the mass of the charge to be milled introduced into the mill. The amount of water to be introduced depends on the technique used and on the constituents of the charge to be milled. The amount of water to be introduced falls within the competence of a person skilled in the art.

Preferably, the liquid medium and the starting refractory product together represent more than 75%, more than 80%, more than 90% of the mass of the suspension. Preferably, the remainder to 100% consists of the optional siliceous compound and/or of the optional chromium(6)-reducing element.

At the end of step B), a suspension is obtained in which the particles preferably have a median size of less than 40 µm, preferably less than 20 µm, particularly preferably less than 10 µm and/or preferably greater than 2 µm. In a preferred embodiment, the median size of the dry matter of the suspension ranges from 6 to 9 µm. Advantageously, it has been observed that this median size makes it possible to increase the efficacy of the reduction of chromium(6) to chromium(3), but also promotes the implementation of step D).

The milling performed in step B) allows intimate mixing of the particles in suspension. The size of these particles is sufficiently reduced for it to be no longer possible to find their origins (new or used starting refractory product).

Preferably, the milling is performed in the presence of balls comprising iron, which makes it possible to introduce metallic iron, an element which reduces chromium(6) to chromium(3).

Steps C) to H) may be performed according to conventional processes.

Step C)

In step C), the particles of the suspension obtained at the end of step B) are used to prepare the starting mixture.

To this end, the suspension may be partially or completely dried. Preferably, however, the suspension is used without any drying operation being performed. In any case, the starting mixture contains more than 10%, preferably more than 20%, preferably more than 30% and/or less than 60%, preferably less than 50%, preferably less than 40% of particles of said suspension, as a mass percentage of the starting mixture, in particular when the dry matter of the charge to be milled in step B) consists for more than 80% of its mass, for more than 90% of its mass, or even substantially entirely consists of the starting refractory product.

The starting mixture may also comprise oxides other than those derived from the charge to be milled, for example particles of $Cr_2O_3$, $ZrO_2$, $Al_2O_3$, $TiO_2$, MgO, CaO, $SiO_2$ and also particles made of a mixture of these oxides. Preferably, the oxides represent more than 80%, or even more than 90%, or even substantially 100% of the particles of the starting mixture. Preferably, the powder of the particles of these refractory oxides has a median size of less than 100 µm, preferably less than 50 µm, or even less than 10 µm, or even less than 5 µm.

The remainder to 100% of the oxides derived from the charge to be milled, in the starting mixture, preferably consists of chromium oxide particles and/or alumina particles and/or zirconia particles and/or magnesia particles and/or iron oxide particles and/or titanium oxide particles and/or silica particles and/or calcium oxide particles, and/or particles made of a mixture of these oxides, the impurities preferably representing less than 5%, as a mass percentage on the basis of the oxides.

In this remainder to 100%, the alumina preferably represents more than 70%, more than 80% of the mass of the oxides.

Preferably, the remainder to 100% (as a mass percentage on the basis of the oxides) of the oxides derived from the charge to be milled, in the starting mixture, is a mixture of alumina and/or chromium oxide powders, optionally in the form of a solid solution, preferably with a median size of less than 50 μm.

Besides the oxides, the starting mixture may conventionally comprise binders, preferably temporary binders and/or sintering additives, such as those that may be used in step a) described below.

Step D)

The optional step D) consists in forming the starting mixture to obtain a green part, preferably by performing a technique such as extrusion, granulation or chamotting, preferably using granulation.

According to a first preferred variant, the green part is a grain.

According to a second preferred variant, this green part is a granule.

According to a third variant, the green part is a block.

Step E)

Optionally, the green parts obtained at the end of step D) are dried during a step E).

The drying is preferably performed at a temperature below 200° C., for a time of greater than 1 hour, preferably between 2 hours and 72 hours. Preferably, the drying is performed at a temperature of 110° C. for a time of 24 hours.

According to another preferred variant, step D) uses a drying granulator, for example a model RV15 blender sold by the company Eirich. The green parts obtained when this preferred variant is performed are granules with a water content of less than 6%, which advantageously makes it possible not to have to perform the drying step E).

Step F)

Step F) consists in sintering the green part obtained in the preceding step.

Preferably, the sintering is performed by heating at a temperature of between 1100° C. and 1700° C. for a time preferably of between 1 and 10 hours.

Preferably, the sintering of the green part is performed at a temperature of between 1400° C. and 1700° C. and preferably between 1450° C. and 1600° C.

Preferably, the steady-stage maintenance time, i.e. the time of maintenance at the required temperature, is between 1 hour and 10 hours and preferably between 1.5 hours and 3 hours.

The sintering may be performed in air, but also under neutral conditions, for example under nitrogen, or alternatively under reductive conditions, for example in an excess of carbon monoxide.

Preferably, the sintering is performed under reductive conditions.

After step F), a sintered body is obtained, which may be in the form of grains, fine particles or a block, preferably having a density of greater than 85%, preferably greater than 88%, preferably greater than 90%, and better still greater than 92% of the theoretical density.

Step G)

According to one variant, in particular when step F) leads to blocks or particles that are too large to be reused, step F) may be followed by an optional step G) of milling.

The milling may generate fine particles, which, preferably, are separated from the grains during a step H).

If the sintered body obtained after step F) is a granule powder, this optional step is preferably not performed.

Step H)

According to one variant, step F) or step G) may be followed by an optional step H) of granulometric selection.

This step is directed toward obtaining powders whose particle size is within a precise range, adapted to the intended application.

The granulometric selection step is preferably performed by screening the particles obtained at the end of step F) or at the end of step G).

The process according to the invention makes it possible to prepare powders of sintered refractory grains from starting refractory products containing new and/or used chromium oxides. These powders may also comprise fine particles, which may be separated out by the granulometric selection.

When the starting refractory product contains large amounts of chromium(6), especially with a used refractory product, the process according to the invention makes it possible to obtain grains whose content of chromium(6) is low: this chromium(6) content may be less than 100 ppm and preferably less than 10 ppm.

Refractory Grains

The grains according to the invention have a microstructure different than that of the grains produced from new starting materials.

The grains according to the invention can keep the trace of the starting refractory product used in the process according to the invention. For example, they may comprise composite elements, especially derived from sintered starting refractory products, such as element 10 in FIG. 1. They may also comprise traces of a vitreous silicate phase when the suspension contained a siliceous compound and/or when the starting refractory products contained a siliceous compound, originating, for example, from glass with which said refractory products were in contact during their use.

The distribution of alumina, and/or the presence of boron oxide, and/or the form of the zones of vitreous silicate phase and/or the content of chromium(3) oxide and/or of iron oxide and/or of calcium oxide and/or of boron oxide contained in the large zones of vitreous silicate phase may also indicate that a refractory product has been manufactured according to the invention. In particular, the presence of boron oxide may be the signature of the presence of starting refractory products that have been in contact with glasses used in the manufacture of glass wool, these glasses usually containing boron oxide. Said boron oxide is generally located in the vitreous silicate phase.

Furthermore, the grains obtained via a process according to the invention have a homogeneity of their composition which is lower than that of the grains of the prior art manufactured from starting materials but higher than that of the milled particles of refractory products according to the prior art.

According to the inventors, the distinction between the grains known in the prior art and the grains according to the invention, i.e. the signature of the process, lies in the distribution of chromium oxide.

A grain according to the invention preferably has a mean content of chromium(3) oxide "C", measured by X-ray fluorescence, of less than 90%, preferably less than 80%, preferably less than 70%, or even less than 65%, or even less than 55%, or even less than 45%, or even less than 35%, or even less than 25%.

Preferably, on a view in cross section (after polishing) allowing the observation of a surface of the grain with a length of greater than 200 μm and a width of greater than 150 μm, a chromium-alumina solid solution is observed, which is percolating, i.e. continuous, and heterogeneous, i.e. comprising a zone of heterogeneity, preferably more than one zone of heterogeneity, or even more than two zones of heterogeneity.

A zone of heterogeneity is a zone in which the smallest dimension is greater than 5 µm, or even greater than 10 µm, and in which the chromium oxide content is
less than C−1.5% or greater than C+1.5% if C≤30% or
less than (1−x)·C or greater than (1+x)·C, with x>0.05, or even x>0.1, or even x>0.2, or even x>0.3, or even x>0.4, or even x>0.5, if C>30%.

A grain according to the invention thus has, in the chromium-alumina solid solution, a less homogeneous distribution of the chromium(3) oxide than that obtained from starting materials, associated with the fact that said grain contains recycled starting refractory products.

A grain according to the invention, in particular manufactured from new starting refractory products, may comprise one or more of the following phases:
a spinel phase,
a phase comprising titanium,
a phase comprising zirconia.

Analysis of these refractory products via elementary cartography methods or microprobe pointing methods shows the presence of a fairly constant level of chromium within the chromium-alumina solid solution or the spinel phase.

The inventors have observed that the size of the crystals of chromium-alumina solid solution of the grains according to the invention is generally greater than that of the grains obtained from new starting materials.

Preferably, the dimension of the grain according to the invention is greater than or equal to 0.5 mm, or even greater than or equal to 2 mm.

Powder

A powder according to the invention may comprise more than 80%, more than 90%, more than 99%, preferably substantially 100% of grains according to the invention, as a mass percentage.

Preferably, the powder according to the invention has:
a maximum size, $D_{99.5}$, of less than or equal to 10 mm, preferably less than or equal to 6 mm, and/or
a percentile 10, $D_{10}$, of greater than 0.5 mm, or even greater than 1 mm, or even greater than 1.5 mm, or even greater than 2 mm.

Process for Manufacturing the Final Refractory Product

All the conventional processes may be performed, provided that the starting charge incorporates grains according to the invention.

In step a), fine refractory particles and refractory grains are mixed together (to constitute a "particulate mixture" according to the invention), preferably with a forming additive, to form the starting charge. The invention also relates to such a starting charge.

The particulate mixture of the starting charge may comprise more than 15%, more than 25%, more than 35%, more than 50%, more than 60% and/or less than 80%, less than 75% of grains according to the invention, as a mass percentage on the basis of the mass of the oxides.

Preferably, the starting charge consists for more than 95%, preferably for more than 97%, preferably for more than 99% of oxides.

A particulate mixture (grains and fine particles) according to the invention comprises, preferably, more than 15%, more than 20%, and/or less than 40%, or even less than 35%, or even less than 30% of fine particles, as a mass percentage relative to the particulate mixture, the remainder by definition consisting of grains.

Preferably, the starting charge has a content of $Cr_2O_3$+$Al_2O_3$ of greater than 60%, preferably greater than 65%, preferably greater than 70%, preferably greater than 80%, or even greater than 90%, or even greater than 92%, or even greater than 94%, as a mass percentage on the basis of the oxides.

In one embodiment, the particulate mixture does not contain any zirconia particles.

Preferably, the mass amount of chromium(3) oxide provided by the fine fraction is between 40% and 60%, preferably between 45% and 55% of the mass of chromium(3) oxide in the starting charge.

The fine fraction preferably consists of chromium(3) oxide particles, on the one hand, and, on the other hand, of alumina particles and/or zirconia particles and/or magnesia particles and/or iron oxide particles and/or titanium oxide particles and/or silica particles and/or calcium oxide particles. Preferably, the fine fraction consists of particles composed of chromium(3) oxide, on the one hand, and, on the other hand, of alumina and/or zirconia and/or magnesia and/or iron oxide and/or titanium oxide and/or silica and/or calcium oxide, or mixtures of such particles. For example, the fine fraction may be a mixture of chromium(3) oxide particles and of alumina particles, but may also consist of chromium(3) oxide particles and of alumina, in the form, for example, of a solid solution. The amount of fine zirconia particles is preferably less than 10%, preferably less than 8%, preferably less than 5%, preferably less than 3%, as a mass percentage on the basis of the oxides of the particulate mixture (grains and fine particles).

The granulate preferably consists of grains comprising chromium(3) oxide and especially of grains according to the invention, on the one hand, and, on the other hand, of alumina grains and/or zirconia grains and/or magnesia grains and/or iron oxide grains and/or titanium oxide grains and/or silica grains. Preferably, the granulate consists of grains composed of chromium(3) oxide, on the one hand, and, on the other hand, of alumina and/or zirconia and/or magnesia and/or iron oxide and/or titanium oxide and/or silica, or mixtures of such grains. For example, the granulate may be a mixture of grains according to the invention and of alumina grains, but may also be a mixture of chromium(3) oxide grains and of alumina, in the form, for example, of a solid solution. Preferably, the grains are composed of chromium(3) oxide, on the one hand, and, on the other hand, of alumina and/or zirconia and/or titanium oxide.

The granulate may contain granules. Preferably, the granulate contains more than 60%, more than 70%, more than 80%, more than 90%, or even substantially 100%, as a mass percentage, of granules.

Preferably, the granules have a median sphericity index of greater than 0.70, greater than 0.80, greater than 0.85, greater than 0.87.

Preferably, at least 80% by mass of the grains of the granulate have a chemical composition such that, as mass percentages on the basis of the oxides and for a total of 100%:
$Cr_2O_3+Al_2O_3+ZrO_2+MgO+Fe_2O_3+SiO_2+TiO_2 \geq 90\%$, preferably ≥95%, and
$Cr_2O_3+Al_2O_3+MgO \geq 60\%$, and
$Cr_2O_3 \geq 9\%$, and
$20\% \geq SiO_2 \geq 0.5\%$, and
other oxides: ≤10%, preferably ≤0.5%.

Preferably, at least 90% by mass of the grains have a size of greater than 100 µm, preferably greater than 200 µm, preferably greater than 300 µm, preferably greater than 400 µm.

The inventors have discovered, surprisingly, that a final refractory product comprising such grains has high corrosion resistance.

Preferably, the grains of the granulate contain a $Cr_2O_3$—$Al_2O_3$ solid solution and/or a spinel based on $Cr_2O_3$—MgO, for example $MgCr_2O_4$, and/or a spinel based on $Cr_2O_3$-iron oxide, for example $FeCr_2O_4$, and/or a spinel based on $Al_2O_3$—MgO, for example $MgAl_2O_4$, and/or a spinel based on $Al_2O_3$-iron oxide, for example $FeAl_2O_4$, and solid solutions thereof.

Still preferably, the sum of the contents of oxides in the grains of the granulate represents more than 90%, more than 95%, or even substantially 100% of the mass of said granules. The inventors have found that the final refractory products with such compositions have an increased service life when they are in contact with molten glass. The inventors have, in point of fact, observed that the "holes" at the surface in contact with the molten glass, corresponding to the zones in which the wear is maximal, limit the service life of the refractory products, irrespective of their composition. They have found that a product manufactured from such grains obtained according to the invention advantageously has a particularly uniform corrosion profile, which would explain its longer service life.

The starting charge may also contain, in addition to the particulate mixture, at least 0.1% by mass of a forming additive.

The additive may be chosen in particular from the group consisting of:
- clays;
- plasticizers, such as polyethylene glycol (or PEG) or polyvinyl alcohol (or PVA);
- cements, preferably with a high content of alumina;
- hydratable aluminas, such as boehmite;
- binders, including temporary organic binders such as resins, lignosulfonates, carboxymethylcellulose or dextrin;
- deflocculants, such as alkali metal polyphosphates, alkali metal polyacrylates, polycarboxylates; and
- mixtures of these products.

Preferably, the forming additive is chosen from the group consisting of cements, deflocculants, clays, lignosulfonates, PVA, and mixtures thereof.

Preferably, the content of forming additive is less than 6%, as a mass percentage on the basis of the starting charge.

The amount of water depends on the process used in step b). It is generally between 1% and 10%, as a mass percentage on the basis of the starting charge without the additives.

The forming of the optional step b) may be performed via various techniques, among which mention may be made of cold pressing, casting as a slip, vibrocasting.

In the case of forming by cold pressing, an addition of an amount of water of between 1.5% and 4%, as a mass percentage on the basis of the starting charge without the additives, is preferred. In the case of forming involving hydraulic binding, for instance casting, an addition of an amount of water of between 3% and 7%, as a mass percentage on the basis of the starting charge without the additives, is preferred.

Drying may be performed during an optional step c). Preferably, the drying is performed at a temperature of between 100° C. and 600° C. and preferably between 200° C. and 350° C. The time of maintenance at this temperature is preferably between 3 hours and 100 hours. Sintering of the green part is performed during a step d). It is possible to install a green part in its final position, especially when the green part is intended to be installed in a glass-melting furnace. Thus, said green part is sintered in situ in the furnace, after its installation, during the temperature rise of said furnace.

Preferably, the green part is, however, sintered before its final installation.

The sintering conditions, and in particular the sintering temperature, depend on the composition of the starting charge. Usually, a sintering temperature of between 1400° C. and 1700° C. and preferably between 1500° C. and 1600° C. very is suitable for use. Preferably, the sintering proceeds under oxidative conditions, preferably in air. After step d), a "final" sintered refractory product is obtained.

Sintering leads to products having a granulate bound by a binding matrix. This process advantageously makes it possible to manufacture a sintered final refractory product based on chromium oxide having an apparent density of between 3.1 and 4.5 g/cm$^3$ and preferably between 3.3 and 4.3 g/cm$^3$. The Andréasen or Fuller-Bolomey compaction models may be used to modify the apparent density. Such compaction models are especially described in the book entitled "Traité de céramiques et matériaux minéraux [Treatise on ceramics and mineral materials]", C. A. Jouenne, Editions Septima. Paris (1984), pages 403 to 405.

The final refractory product may undergo a finishing operation during an optional step e), chosen especially from sawing, surfacing, drilling and machining. These operations may be performed according to all the techniques known to those skilled in the art. A person skilled in the art will know how to adapt the technique as a function of the composition of the final refractory product and of the desired form.

The invention also relates to a sintered final refractory product comprising between 10% and 85% by mass of grains according to the invention.

EXAMPLES

The following examples are given as illustrations and do not in any way limit the scope of the invention.

The following measurements were taken:

The measurements of the apparent density and of the open porosity of an assembly of particles were performed according to the following method:

- Dry at 110° C. for at least 12 hours four samples of 35 grams each consisting of particles whose size is between 2 and 5 mm. The dry mass of each of the samples is noted $Ps_1$, $Ps_2$, $Ps_3$ and $Ps_4$. $Ps=Ps_1+Ps_2+Ps_3+Ps_4$ is noted.
- Place each sample in a bottle.
- Using a vacuum pump, create a vacuum of at least 0.07 MPa in each of the bottles and maintain this vacuum for 7 minutes. Next, introduce water into the bottle so as to cover the particles with at least 2 cm of water, which allows the particles to be always covered with water during the subsequent applications of vacuum.
- Reapply a vacuum of 0.08 MPa in each bottle containing the particles and the water, and maintain this vacuum for 7 minutes. Break the vacuum.
- Reapply a vacuum of 0.08 MPa in each bottle and maintain this vacuum for 7 minutes. Break the vacuum.
- Reapply a vacuum of 0.08 MPa in each bottle and maintain this vacuum for 7 minutes. Break the vacuum.
- Determine the immersed weight of each sample, $Pi_1$, $Pi_2$, $Pi_3$ and $Pi_4$. $Pi=Pi_1+Pi_2+Pi_3+Pi_4$ is noted.
- Next, pour the contents of the four bottles through a screen with square meshes of 2 mm so as to remove the water. Next, pour the particles onto a dry cotton fabric in order to remove the excess water and wipe the particles until the moisture sheen has disappeared from their surface.

Determine the wet weight Ph of the assembly of particles.

The apparent density of the assembly of particles is equal to Ps/(Ph−Pi).

The open porosity of the assembly of particles is equal to (Ph−Ps)/(Ph−Pi).

These measurements are always performed on assemblies of sintered particles. They correspond to mean measurements on the material constituting the particles, i.e. they do not take into account the intestices between the various particles.

The measurements of the apparent density and of the open porosity of a body or of a sintered product were performed on samples with dimensions of 125×25×25 mm³, according to standard ISO 5017.

The chemical analyses were performed by X-ray fluorescence as regards the constituents whose content is greater than 0.5%. The content of the constituents present in an amount of less than 0.5% was determined by AES-ICP (Atomic Emission Spectroscopy-Inductively Coupled Plasma).

The measurements of the chromium(6) contents were performed by extraction by leaching, according to standard NF EN12457-2, and the amount of Cr6+ is then obtained via analysis by liquid-phase ionic chromatography.

To measure the mean corrosion rate, samples in the form of cylindrical bars with an initial radius $r_o$ equal to 11 mm and 100 mm tall were taken and subjected to a test consisting in rotating the samples immersed in a bath of molten glass C, maintained at a temperature T of 1450° C. The spin speed of the samples was 6 revolutions per minute. The samples were kept immersed for a time $\Delta t$ of 120 hours. At the end of this period and after cooling, the part of a sample which was dipped in the glass (height H=30 mm) has a cross section in the form of an ellipse with a small axis Pa and a large axis Ga. For each sample, the minimum value of Pa (Pam) in mm, the maximum value of Pa (PaM) in mm, the minimum value of Ga (Gam) in mm and the maximum value of Ga (GaM) in mm are determined. $Pa_{mean}=(Pam+PaM)/2$ and $Ga_{mean}=(Gam+GaM)/2$ are set. For each sample, the mean remaining volume $Vr_{mean}$ is determined via the formula $Vr_{mean}=(\pi \cdot H \cdot Pa_{mean} \cdot Ga_{mean})/4$. For each sample, the mean corroded volume $Vc_{mean}$ is then determined via the formula: $Vc_{mean}=[(\pi \cdot H \cdot 22)/4]-Vr_{mean}$.

The mean corrosion rate "Vu" of a sample is determined via the formula $$Vu = \frac{r_0 - \sqrt{r_0^2 - \left(\frac{Vc_{mean}}{\pi H}\right)}}{\Delta t}.$$

This rate gives an evaluation of the corrosion resistance of the test sample. Thus, the lower the corrosion rate of a sample, the greater its resistance to corrosion by the molten glass.

1°/Manufacture of the Granules of the Comparative Example, G0, not Containing any New or Used Recycled Products A starting charge of 80 kg having the following composition is prepared:

40% of pigmentary chromium oxide $Cr_2O_3$ with a purity of greater than 95%, having a specific surface area equal to 4 m²/g and a median size of 0.7 μm, 19% of alumina with a purity of greater than 97%, having a median size equal to 5 μm and a specific surface area equal to 0.8 m²/g, 38% of reactive alumina with a purity of greater than 99%, having a specific surface area equal to 7 m²/g and a median size equal to 0.6 μm, 1.5% of titanium oxide in rutile form, with a purity of greater than 93% and having a median size equal to 1.5 μm, 1.5% of fumed silica ER sold by the company Société Européenne des Produits Réfractaires (France).

This starting charge is mixed for 2 hours in a mixer of Tumbler type.

50 kg of the starting charge obtained are then introduced into an R08 blender sold by the company Eirich, along with 7.5 kg of water and 2.5 kg of Optapix PAF35 binder sold by the company Zschimmer & Schwarz.

The assembly is blended for 3 minutes with a turbine speed of 230 rpm. Next, 18 kg of the starting charge are added and blending is continued for 1 minute 30 seconds at a speed of 460 rpm.

Finally, 12 kg of the starting charge are added and the assembly is blended for 1 minute 30 seconds at a speed of 460 rpm. Granules are obtained, which are discharged.

The granules obtained are then dried in air for 24 hours at 110° C.

The granules obtained are then sintered at 1550° C. for a steady-stage time of 3 hours, in air, with a temperature increase rate and a temperature decrease rate of 50° C./hour.

After sintering, the granules are screened and the particle size fraction 0.5-5 mm is retained.

At the end of this step, the granules have the characteristics shown in table 1 below (composition as a mass percentage on the basis of the oxides):

TABLE 1

| Example | G0 |
| --- | --- |
| $Cr_2O_3$ (%) | 39.6 |
| $Al_2O_3$ (%) | 53.7 |
| $ZrO_2$ (%) | 0.41 |
| $SiO_2$ (%) | 2.22 |
| Others (%) | 4.1 |
| Chromium (6) (ppm) | <10 |
| Apparent density (g/cm³) | 4.12 |
| Open porosity (%) | 1.3 |

2°/Example of Reintroduction of New Starting Refractory Products: Manufacture of the Granules G1

Step A)

Sintered and non-sintered production offcuts, and also sawing wastes of the product sold by the company SEFPRO under the name ZIRCHROM30 were broken using a rotary crusher, and then using a jaw crusher so as to obtain a charge to be milled mainly consisting of blocks whose largest dimension is less than 30 mm, so as to facilitate their introduction into the laboratory milling jar during the subsequent step B).

Step B)

The charge to be milled consists of 3.25 kg of blocks obtained, 162 g of fumed silica ER sold by the company Société Européenne des Produits Réfractaires (France) and 55 g of ascorbic acid. This charge to be milled is introduced into an 8 liter porcelain milling jar sold by the company Faure, placed in a Faure brand jar spinner. 5.5 kg of iron balls with a diameter of between 20 mm and 40 mm, and 1.142 liters of water are also placed in the jar.

The charge to be milled was milled for 24 hours at a spin speed equal to 15 rpm.

At the end of milling, the balls are removed. The dry matter of the suspension then has the characteristics described in table 2 below:

TABLE 2

| Median size (μm) | 7.6 |
|---|---|
| Composition (as mass percentages on the basis of the oxides) | |
| $Cr_2O_3$ (%) | 33.5 |
| $Al_2O_3$ (%) | 38.5 |
| $ZrO_2$ (%) | 14.5 |
| $TiO_2$ (%) | 0.53 |
| $SiO_2$ (%) | 11.1 |
| CaO + MgO (%) | 0.55 |
| Others (%) | 1.32 |
| Chromium(6) (ppm) | <10 |

Step C)

The starting mixture is prepared by mixing, in an Eirich RV02 blender:

739 g of the suspension obtained at the end of step B), i.e. 529 g of dry matter;

1206 g of a premix consisting of:

41% of pigmentary chromium oxide $Cr_2O_3$ with a purity of greater than 95%, having a specific surface area equal to 4 m$^2$/g and a median size of 0.7 μm, 56.9% of reactive alumina with a purity of greater than 99%, having a specific surface area equal to 7 m$^2$/g and a median size of 0.6 μm, 1.5% of titanium oxide in rutile form, in a purity of greater than 93% and having a median size of 1.5 μm;

90 g of Optapix PAF35 binder sold by the company Zschimmer & Schwarz;

Water is introduced such that the final water content of the starting mixture is 20%, as a mass percentage on the basis of the dry matter.

Step D)

The starting mixture is then blended for 1 minute, with a turbine rotating at 300 rpm and a tank adjusted to 43 rpm so as to obtain a homogeneous mixture. The spin speed of the turbine is then increased to 1050 rpm, and an additional amount of 900 grams of oxide premix is then gradually added over 1 minute. The spinning is continued for 2 minutes after the end of introduction of the additional amount of charge. Granules are obtained, which are discharged.

Step E)

The granules obtained are then dried in air for 24 hours at 110° C.

Step F)

The granules obtained are then sintered at 1550° C. for a steady-stage time of 3 hours, in air, with a temperature increase speed and a temperature decrease speed of 50° C./h.

Step H)

After sintering, the granules are screened and the particle size fraction 0.5-5 mm is retained.

At the end of this step, the granules have the characteristics given in table 3 below (composition as a mass percentage on the basis of the oxides):

TABLE 3

| Example | G1 |
|---|---|
| $Cr_2O_3$ (%) | 38.6 |
| $Al_2O_3$ (%) | 50.1 |
| $ZrO_2$ (%) | 5.1 |
| $SiO_2$ (%) | 3.9 |
| Others (%) | 2.3 |
| Chromium(6) (ppm) | <10 |
| Apparent density (g/cm$^3$) | 3.79 |
| Open porosity (%) | 1.34 |

As shown in FIG. 1, it is possible to distinguish, within the granules G1, traces of the starting refractory product (element 18), having a microstructure different than the rest of the granule, zones of heterogeneity 10 and 12 within the chromium-alumina solid solution, and also large zones of vitreous silicate phase 14 and 16.

The granule has:

a chromium oxide content "C" equal to 38.6%, a percolating chromium-alumina solid solution, 1 zone of heterogeneity 10 with a smallest dimension equal to 10 μm having a chromium oxide content equal to 71%, 1 zone of heterogeneity 12 with a smallest dimension equal to 10 μm having a chromium oxide content equal to 75%, 1 large zone of vitreous silicate phase 14 having a silica content equal to 61%, a chromium(3) oxide content equal to 2.1% and a calcium oxide content equal to 3.4%, 1 large zone of vitreous silicate phase 16 having a silica content equal to 60%, a chromium(3) oxide content equal to 1.9% and a calcium oxide content equal to 4%.

This heterogeneity of the chromium oxide content, and also the presence of the vitreous silicate phase, reflect the introduction of a recycled refractory product into the starting charge.

3°/Example of Reintroduction of Used Starting Refractory Products: Manufacture of the Granules G2

Step A)

Products that were used in an insulating glass furnace tank and having the chemical analysis (mass percentages on the basis of the oxides) given in table 4 were stored, after dismantling, in closed "big bags" so as to avoid any contact with the external environment. These products were broken, under a spray of an aqueous solution containing 100 g/l of ascorbic acid, using a rock breaker so as to obtain a charge to be milled mainly consisting of blocks whose largest dimension is less than 100 mm, so as to facilitate their introduction into the mill during the subsequent step C).

TABLE 4

| $Cr_2O_3$ (%) | $Al_2O_3$ (%) | $ZrO_2$ (%) | $TiO_2$ (%) | $SiO_2$ (%) | Others (%) | Chromium (6) (ppm) |
|---|---|---|---|---|---|---|
| 34.4 | 49.5 | 5.6 | 0.36 | 6.0 | 4.14 | 165 ppm |

Unlike the starting products used for manufacturing the granules G1, the used starting product comprises more than 100 ppm of chromium(6).

Step B)

The charge to be milled consists of 150 kg of blocks obtained at the end of step A), 2.55 kg of ascorbic acid (L-(+)-ascorbic acid) sold by the company VWR International, and 7.5 kg of fumed silica sold by the company Société Européenne des Produits Réfractaires, this vitreous silica containing more than 93% of silica ($SiO_2$) and being in the form of a powder whose particles have a size of between 0.1 and 5 μm and having a median size of 0.5 μm. The charge to be milled is introduced into a cylindrical mill, 670 mm in diameter and 580 mm in length, of a model sold by the company BHIL. The following are also introduced into the mill:

- 150 kg of iron balls of diameter<50 mm;
- 52.5 liters of water.

The charge to be milled was milled for 24 hours at a constant spin speed of 34 rpm.

At the end of milling, the balls are removed. The dry matter of the suspension then has the characteristics described in table 5 below:

TABLE 5

| Median size (μm) | 7 μm |
|---|---|
| Composition (as mass percentages on the basis of the oxides) | |
| $Cr_2O_3$ (%) | 33.2 |
| $Al_2O_3$ (%) | 45.2 |
| $ZrO_2$ (%) | 5.4 |
| $TiO_2$ (%) | 0.33 |
| $SiO_2$ (%) | 10.8 |
| Others (%) | 5.33 |
| Chromium(6) (ppm) | <10 ppm |

Step C)

The starting mixture is prepared by mixing, in an Eirich R15 blender:

246 kg of the suspension obtained at the end of step B), i.e. 179.6 kg of dry matter;
225 kg of an oxide premix consisting of:
  43.5% of pigmentary chromium oxide $Cr_2O_3$ with a purity of greater than 95%, having a specific surface area equal to 4 $m^2$/g and a median size of 0.7 μm,
  54.1% of reactive alumina with a purity of greater than 99%, having a specific surface area equal to 7 $m^2$/g and a median size of 0.6 μm,
  2.4% of titanium oxide in rutile form, with a purity of greater than 93% and having a median size of 1.5 μm;
13 kg of Optapix PAF35 binder sold by the company Zschimmer & Schwarz;

No additional water is introduced. The final water content of the mixture is 16.5%.

Step D)

The starting mixture is then blended for 5 minutes 30 seconds with a turbine rotating at 202 rpm and a tank set at 16 rpm so as to obtain a homogeneous mixture. An additional amount of 200 kg of the oxide premix described in the preceding step is then gradually added over 1 minute. The spinning is continued for 5 minutes 30 seconds after the end of introduction of the additional amount of charge. Granules are obtained, which are then discharged.

Step E)

The granules obtained are then dried in air for 24 hours at 110° C.

Step F)

The granules obtained are then sintered at 1550° C. for a steady-stage time of 3 hours, in air, with a temperature increase rate and a temperature decrease rate of 50° C./hour.

Step H)

After sintering, the particles are screened and the particle size fraction 0.5-5 mm is retained. At the end of this step, the granules have the characteristics given in table 6 below (mass percentages on the basis of the oxides):

TABLE 6

| Example | G2 |
|---|---|
| $Cr_2O_3$ (%) | 40.1 |
| $Al_2O_3$ (%) | 51.8 |
| $ZrO_2$ (%) | 1.6 |
| $SiO_2$ (%) | 3.1 |
| Others (%) | 3.4 |
| Chromium(6) (ppm) | <10 |
| Apparent density (g/cm³) | 3.68 |
| Open porosity (%) | 1.2 |

Figure 2:
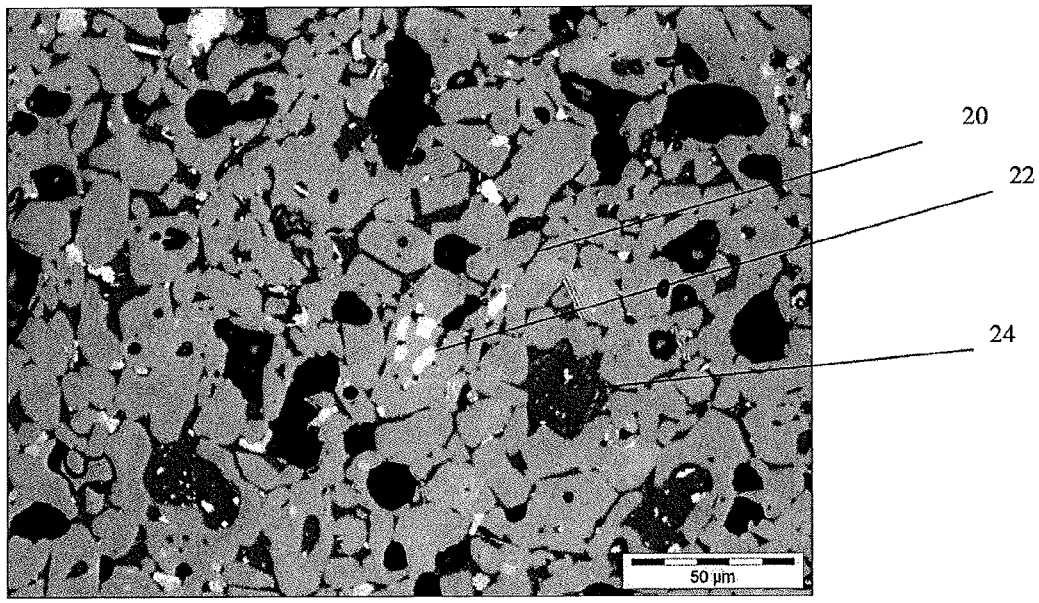
FIG. 2 is a cross section of a grain according to the invention obtained from a used starting refractory product:
the gray elements are crystals of chromium-alumina solid solution,
the black shapes are porosity,
element 24 is a large zone of vitreous silicate phase containing chromium(3) oxide,
element 20 is vitreous silicate phase especially containing chromium(3) oxide,
element 22 is a zirconia particle.

FIG. 2 is a photograph of a cross section of a granule G2.

Sintered final refractory products were manufactured according to a process according to the invention.

In step a), the starting charge was prepared by mixing an amount of water of between 4.1% and 4.7% with a particulate mixture according to the invention, adapted to the desired chemical composition.

The particulate mixture contained 76% of grains according to the invention as a mass percentage relative to the starting charge.

In the products of the comparative examples, the grains according to the invention were replaced with identical amounts of chamotting grains of the same particle size and of substantially the same chemical analysis, but not being obtained according to the invention.

3% of a forming additive (CA25 aluminous cement sold by Almatis) were added to the starting charge.

The fine fraction represented 24% by mass of the oxide particulate mixture, and contained pigmentary chromium oxide, alumina, optionally zirconia and additive. The fine fraction did not contain any particles having the composition of the granules G1 and G2 according to the invention (for the examples according to the invention), or any particles having the composition of the chamotting grains G0 (for the examples outside the invention).

In step b), the starting charge was formed via a vibrocasting technique in the form of a green part having dimensions suited to the measurement to be taken.

In step c), the green part obtained was then dried, and then sintered during a step d) in air at a temperature of 1550° C., for 10 hours, to obtain the final product.

Table 7 shows the particulate mixtures prepared and the results obtained (mass percentages on the basis of the oxides).

TABLE 7

| Examples | 0 | 1 | 2 |
|---|---|---|---|
| Granulates | G0 | G1 | G2 |
| Chamotting grains G0, 0.5-5 mm | 76 | | |
| Grains according to the invention G1, 0.5-5 mm | | 76 | |
| Grains according to the invention G2, 0.5-5 mm | | | 76 |
| Final product | | | |
| $Cr_2O_3$ (%) | 43.7 | 44.9 | 47.2 |
| $Al_2O_3$ (%) | 53.3 | 49.4 | 44 |
| $ZrO_2$ (%) | <0.1 | 2.16 | 1.7 |
| $SiO_2$ (%) | 0.85 | 1.69 | 2.5 |
| $TiO_2$ (%) | 0.99 | 0.96 | 1.3 |
| Others (%) | 1.06 | 0.89 | 3.3 |
| Cr6+ (ppm) | <10 | <10 | <10 |

TABLE 7-continued

| Examples | 0 | 1 | 2 |
|---|---|---|---|
| Apparent density of the sintered product (g/cm$^3$) | 3.60 | 3.61 | 3.56 |
| Open porosity of the sintered product (%) | 15.8 | 16 | 17.3 |
| Mean corrosion rate Vu, in μm/h | 9.34 | 9.8 | 9.7 |

The inventors consider that an increase or decrease in the mean corrosion rate Vu of less than 10% is not significant.

A comparison of the product of example 0 (outside the invention) with the products of examples 1 and 2 obtained from grains according to the invention G1 and G2, respectively, shows similar performance qualities.

A comparison of the products of examples 1 and 2 shows that, despite the use of used products in the manufacture of the grains G2, the product of example 2 has a low content of chromium(6) demonstrating the efficacy of the process according to the invention.

As is now clearly seen, the manufacturing process according to the invention is noteworthy insofar as it enables:
- the manufacture of chromium-based grains from new and/or used products, said grains allowing the preparation of final refractory products whose performance level, especially the resistance to corrosion on contact with molten glass, is at least equivalent to those of products of the same type known in the prior art;
- the recycling of used products containing chromium(6) by reducing the risk of exposure of people working at the workstations;
- the irreversibility of the chromium(6)→chromium(3) transformation during the manufacture of the sintered grains and/or during the use, and especially during the manufacture of products by sintering of these grains.

Needless to say, the invention is not limited by the examples, which are given for purely illustrative purposes.

The invention claimed is:

1. A process for manufacturing sintered refractory grains containing $Cr_2O_3$ from a starting refractory product which is sintered or fused or consists of a mixture of pieces made of a sintered product and of pieces made of a fused product, said starting refractory product comprising one or more chromium oxide(s), all dimensions of the starting refractory product being greater than or equal to 1 mm, said process comprising the following steps, in this order:
   A) optionally, crushing the starting refractory product,
   B) milling a charge to be milled comprising the crushed starting refractory product obtained from step A) or the starting refractory product that has not been crushed, in a liquid medium in order to obtain a suspension of particles of said starting refractory product, more than 80% of said particles, as a mass percentage, having a size of less than 50 μm,
   C) preparing a starting mixture comprising at least 1% by mass of particles of the suspension obtained in the preceding step,
   D) forming the starting mixture in the form of a green part,
   E) optionally, drying the green part obtained in step D),
   F) sintering the green part to obtain a sintered body,
   G) optionally, milling the sintered body, and
   H) optionally, granulometric selection,
   steps D), G) and H) being adapted such that the sintered body, optionally milled in step G) and/or selected in step H), has the form of a particle with a size of greater than 50 μm and less than 20 mm or of a powder comprising such particles.

2. The process according to claim 1, wherein, in step B), the milling is continued until the median size of the particles of the suspension is less than 20 μm.

3. The process according to claim 2, wherein, in step B), the milling is continued until the median size of the particles of the suspension is less than 10 μm.

4. The process according to claim 1, wherein the starting refractory product comprises more than 5% of chromium oxide, as a mass percentage on the basis of the oxides.

5. The process according to claim 1, wherein the charge to be milled comprises alumina, optionally in the form of a solid solution with $Cr_2O_3$.

6. The process according to claim 5, wherein the starting refractory product comprises alumina, optionally in the form of a solid solution with $Cr_2O_3$.

7. The process according to claim 1, wherein the starting refractory product has a chromium(6) content of greater than 100 ppm.

8. The process according to claim 7, wherein the starting refractory product has a chromium(6) content of greater than 150 ppm.

9. The process according to claim 1, wherein all the dimensions of the starting refractory product are greater than or equal to 100 mm.

10. The process according to claim 1, wherein said charge to be milled comprises a chromium(6)-reducing element.

11. The process according to claim 10, wherein the chromium(6)-reducing element is chosen from ascorbic acid, alcohols, oxalic acid, ferrous ammonium sulfates, sodium bisulfites, thiosulfates, iron in metallic form, a compound in which iron is in oxidation state 2+, sulfides, barium compounds, zinc compounds, hydrazine, hydroxylamine, sulfur dioxide, glucose, salts in which titanium is in oxidation state 3+, borohydrides, hypophosphites, and mixtures thereof.

12. The process according to claim 11, wherein the chromium(6)-reducing element is ascorbic acid.

13. The process according to claim 11, wherein the amount of chromium(6)-reducing element in said charge to be milled is between 0.1% and 10% by mass relative to the mass of the starting refractory product.

14. The process according to claim 1, wherein said charge to be milled comprises a siliceous compound comprising more than 35% by mass of silica.

15. The process according to claim 14, wherein the siliceous compound is chosen from glasses comprising silica, crystalline silica particles, fumed silica, and mixtures thereof.

16. The process according to claim 15, wherein the siliceous compound is fumed silica.

17. The process according to claim 14, wherein the amount of silica provided by said siliceous compound is between 1% and 10% by mass relative to the mass of the dry matter of the charge to be milled.

18. The process as claimed claim 1, wherein the starting refractory product comprises more than 100 ppm of chromium(6) and the milling step B) is performed in the presence, in said liquid medium, of a chromium(6)-reducing element that is capable of reducing chromium(6) to chromium(3) and in the presence of a siliceous compound containing more than 35% by mass of silica.

19. The process according to claim 1, wherein the starting mixture comprises less than 60% by mass of particles of the suspension obtained after step B).

20. The process according to claim 1, wherein the starting mixture comprises a mixture of alumina and/or chromium oxide powders, optionally in the form of a solid solution.

21. The process according to claim 1, wherein, in step B), the optionally crushed starting refractory product represents more than 50% of the mass of the solid elements containing $Cr_2O_3$ of the charge to be milled.

22. The process according to claim 1, wherein, in step B), the charge to be milled contains machining slurries containing chromium oxides and/or particles containing a chromium oxide not derived from the starting refractory product.

23. The process according to claim 1, wherein the green part obtained in step D) is a grain.

24. The process according to claim 1, wherein the sintering in step F) is performed under reductive conditions.

25. The process according to claim 1, wherein, at the end of step F), the sintered body has a density of greater than 85% of the theoretical density.

* * * * *